United States Patent [19]

Reynolds et al.

[11] 4,423,012

[45] Dec. 27, 1983

[54] MANGANESE AND ZINC SOLVENT EXTRACTION PROCESS

[75] Inventors: James E. Reynolds, Golden; Nicholas J. Lombardo, Boulder, both of Colo.

[73] Assignee: Hazen Research Incorporated, Golden, Colo.

[21] Appl. No.: 336,502

[22] Filed: Dec. 31, 1981

[51] Int. Cl.$^3$ .................. C01G 9/00; C01G 45/00
[52] U.S. Cl. .................................. 423/49; 423/99; 204/105 M; 204/114
[58] Field of Search .................. 423/49, 99; 204/114, 204/105 M

[56] References Cited

U.S. PATENT DOCUMENTS

| | | | |
|---|---|---|---|
| 3,399,055 | 8/1968 | Ruthy | 75/119 |
| 3,479,378 | 11/1969 | Orlandini et al. | 423/49 |
| 3,996,334 | 12/1976 | Hartman et al. | |
| 4,272,492 | 6/1981 | Jensen | 423/24 |
| 4,279,870 | 7/1981 | Nathansohn | 423/54 |
| 4,290,866 | 9/1981 | Bolton et al. | 204/119 |

OTHER PUBLICATIONS

Giganov et al., "Chem. Abstracts", vol. 70, 1969, #23535n.
Greenberg, "Chem. Abstracts", vol. 66, 1967, #67990d.

Primary Examiner—Herbert T. Carter

[57] ABSTRACT

Improvement in electrowinning manganese dioxide, or zinc in which the relative concentration of manganese or zinc ions to impurities is enhanced by selectively extracting manganese or zinc ions from a bleed taken from the electrowinning feed stream with an organic extractant, while rejecting impurities, stripping the loaded organics with spent electrolyte, and recycling loaded strip to the electrowinning feed. Stripped organic may be regenerated with an alkaline agent such as calcium oxide or magnesium oxide prior to recycle, and pH may be controlled during extraction by the same means.

27 Claims, No Drawings

MANGANESE AND ZINC SOLVENT EXTRACTION PROCESS

DESCRIPTION

1. Technical Field

The process of the present invention relates to the recovery of manganese and zinc ions from aqueous sources by liquid-liquid solvent extraction. More particularly it is concerned with a method for increasing the relative concentration of desired metal ions with respect to impurities in electrowinning feed solutions.

2. Background Art

Manganese and zinc are commonly recovered from their ores by leaching the ores with sulfuric acid, followed by liquid/solid separation and an electrowinning step. A common problem to all circuits, in varying degrees and importance, is the build-up of soluble impurities not removed by conventional purification procedures such as sulfiding to precipitate heavy metal sulfides, and oxyhydrolysis or pH adjustment to remove iron. For example, potassium build-up in electrolytic manganese dioxide processing is harmful to the battery quality of the manganese dioxide product; and, magnesium build-up in manganese and zinc electrowinning circuits is a common problem because most commercial ores and concentrates contain dolomite and clay minerals. Another soluble impurity is chloride ion. It is harmful in a number of ways, e.g., corrosion of lead alloy anodes and pitting of cathode deposits. Chloride can enter the electrolytic circuit as an impurity in the ore feed as in rhodochrosite manganese ores, or with water makeup.

Zinc electrowinning is accompanied by some deposition of unwanted manganese dioxide on the anode. These deposits slough off and build up as sludge in the cell tanks and increase cell voltage. Manganese cannot be removed by sulfiding, so it builds to high levels in the circulating electrolyte.

Fluoride ion is harmful in zinc electrodeposition using aluminum cathode sheets. A small purge or bleed of the circuit can prevent a large number of cycles of concentration of fluoride ion from exceeding about 2 ppm where its effect becomes evident by sticking of zinc deposits to the cathode.

Most electrowinning circuits are saturated with calcium sulfate at 2 to 3 grams per liter. Gypsum ($CaSO_4 \cdot 2H_2O$) is deposited on cold surfaces such as tank walls, pipelines, etc. Anhydrite ($CaSO_4$) grows as a tenacious scale on hot surfaces (due to inverse solubility) such as steam heated exchangers, and on all surfaces in manganese dioxide cells operated at 90° C. to 95° C. because the electrolyte changes its composition due to evaporation and electrolytic production of sulfuric acid. These complications can be avoided by a small purge of electrolyte and replacement with calcium-free solution so as to unsaturate the solution with respect to calcium.

Another problem, common to most hydrometallurgical processes is water balance, i.e., careful control of water added to closed loop circuits. Water enters the process at a number of points, including direct steam injection for solution heating; however, normal evaporative losses and moisture removed in leach tailings often do not keep pace with water addition. Thus, an alternate method to remove water, other than energy-intensive evaporation, is an advantage of a purification process for purging water as well as soluble impurities.

Accordingly, the objects of this invention are to enhance the concentration of the desired metals, manganese or zinc, with respect to impurities while reducing the relative concentrations of the undesirable impurities in electrowinning solution feeds; and to provide a mechanism for removing water from balanced hydrometallurgical processes with electrowinning circuits.

Prior Art Statement

Methods for removing a number of metals from aqueous solution by solvent extraction are known to the art. U.S. Pat. No. 4,272,492, issued June 9, 1981 to Jensen, for "Selective Extraction And Recovery Of Copper" discloses a method for recovering copper from an acidic chloride solution with a solvent extraction agent, which requires stripping the extractant with an aqueous solution, re-extracting copper with a hydrogen ion exchange extractant, and restripping with an aqueous acidic solution. U.S. Pat. No. 4,279,870, issued July 21, 1981 to Natansohn, et al., for "Liquid-Liquid Extraction Process For The Recovery Of Tungsten From Low Level Sources," discloses a process for extracting tungsten from an aqueous solution by means of an organic extractant comprising a chelating agent, an organic transfer agent and an inert organic solvent. Chemical Abstracts, Volume 66, 1967, at 67995j, discloses a process for solvent extraction of indium using bis (2-ethylhexyl) phosphate and mono-2-ethylhexyl phosphate. Chemical Abstracts, Volume 70, 1969, at 23535n, discloses a process for indium extraction from sulfate solution using bis (2-ethylhexyl) H phosphate and kerosine, pretreating the solution with metallic iron to reduce ferric concentration. Depending on the metals to be separated, and the type of feed solutions involved, reagents, parameters, and processing steps for solvent extraction processes vary widely. None of the foregoing prior art deals with the separation of manganese and/or zinc from electrolytes with the express purpose of removing impurities.

U.S. Pat. No. 4,290,866, issued Sept. 22, 1981, to Bolton, et al. discloses a process for removing manganese from an electrowinning solution containing zinc and manganese comprising oxidizing the manganese to manganese dioxide with ozone, and removing manganese dioxide from the solution.

U.S. Pat. No. 3,399,055 to Ritcey, et al. on Aug. 27, 1968, describes a solvent extraction process for the separation of cobalt from nickel in a sulfate solution using DEHPA at a carefully controlled pH.

SUMMARY OF THE INVENTION

The concentration of manganese and/or zinc is enhanced, while impurities are removed from aqueous solutions by means of solvent extraction with an organic extractant such as di-ethylhexyl phosphoric acid (DEHPA). Two or three stages of extraction selectively load the desired metals at a carefully controlled pH, leaving a barren raffinate containing unwanted soluble impurities such as alkali metals and alkaline earths. The extractant is stripped with an acidic aqueous solution, and when the feed solution is a bleed stream from an electrowinning circuit, it has been found that spent electrolyte, still containing a significant concentration of the desired metal, may be effectively used to accomplish this step.

The extractant, returned to the hydrogen form by means of the stripping, may be recycled and contacted with fresh feed. As the desired metal loads onto the organic extractant, hydrogen ion is released, and a neutralizing reagent such as magnesium oxide, calcium oxide, ammonia, or sodium hydroxide, is supplied in necessary quantities to the extraction mixtures to control the pH according to the reaction (for NaOH):

$$[HDEHP]_{org} + [NaOH]_{aq} \rightarrow [NaDEHP \cdot H_2O]_{org}$$

Optionally, or in addition to neutralization in the mixers, prior to being recycled to contact fresh feed, the stripped extractant may be regenerated, as necessary, with an alkaline agent, preferably with calcium oxide or mangesium oxide to replace hydrogen on the extractant with a cation which will not disrupt the pH of the system upon loading.

When calcium oxide is used as the regeneration reagent, the process includes provision for removal of gypsum which precipitates during extraction when fresh extractant enters the system and the calcium form of DEHPA exchanges with manganese or zinc cations and combines with sulfate in the aqueous phase to form crystalline $CaSO_4 \cdot 2H_2O$. A settler generally removes the excess gypsum. When magnesium oxide is used as the regeneration reagent, a high-strength $MgSO_4$ raffinate is produced, and $MgSO_4$ may be recovered by conventional evaporation/crystallization to produce a high-purity epsom salt ($MgSO_4 \cdot 7H_2O$).

A water scrub following the extraction stages is sometimes desirable in order to remove any impurities contained in the entrained aqueous component.

DETAILED DESCRIPTION OF THE PREFERRED EMBODIMENTS

In a preferred embodiment of the invention, a bleed stream taken from an electrowinning circuit for recovery of manganese dioxide is treated to enhance the concentration of manganese, and reduce the concentration of impurities therein, such as calcium, magnesium, chloride, potassium, and sodium.

A typical feed solution for the electrowinning of manganese dioxide contains between 40 and 60 g/l manganese, between 5 and 30 g/l magnesium, between 0.5 and 1 g/l calcium, between 0.1 and 2 g/l chloride, between 0.5 and 2 g/l potassium, and between 1 and 3 g/l sodium.

The process of this invention effectively extracts and returns to the circuit up to about 98 weight percent of the manganese, while returning to the circuit as little as 1.8 weight percent of the magnesium originally present, and 0.4 weight percent of the sodium originally present, and essentially eliminating chloride and potassium, while reducing calcium by one-half. The loaded aqueous solution resulting from this process is suitable for cycling back into the electrowinning cell to enhance overall manganese dioxide recovery.

Typically, the bleed stream is at a pH of between about 4.5 and 6.5, and preferrably about 5.5, and will be at a temperature of between about 30° and 55° C.

The bleed stream enters a first extraction mixer-settler tank where it is contacted with an organic extractant. The preferred extractant is di-ethylehexyl phosphoric acid (DEHPA) in a low-aromatic diluent such as Escaid 200. Escaid 200 is a proprietary trademark of EXXON Company, P.O. Box 20224, Dallas, Tex., 75220, and consists of normal paraffin hydrocarbons.

Preferably, DEHPA is present in the extractant at between about 10 and 50 volume percent, and preferably between about 20 and 30 volume percent, and the balance of the extractant is compised of Escaid 200. Optionally, about 5 volume percent isodecanol may be added to prevent formation of a third phase.

Preferably, the organic to aqueous ratio in the extraction tank is between about 0.5 and 4 to 1, and more preferably between about 1 to 1 and 2 to 1.

The pH of the mixture in the extraction tank is carefully monitored, and a neutralizing agent is added as necessary to control the pH to between about 1 and about 5. When the pH drops below about 1, overall extraction of manganese is inhibited. Preferably the pH is maintained at between about 2.5 and about 5.0 to maximize loading of the manganese on the extractant, and more preferably between about 3.5 and about 4.3 to minimize the number of extraction stages necessary and prevent phase separation problems which may occur above pH about 4.3. Manganese can be separated from magnesium and potassium over a wide pH range; however, the above considerations dictate a pH between about 2.5 and about 5.0 Calcium extraction is at its highest (about 60 percent) at a pH of around 2.0, and drops gradually down to about 30 percent at pH 5.0. Suitable neutralizing agents are known to the art, and may be selected based on economics and ultimate disposition of the barren raffinate. Some preferred neutralizing agents include calcium oxide, magnesium oxide, ammonia, and sodium hydroxide. Preferably calcium oxide or magnesium oxide is added to the first extraction stage; optionally sodium hydroxide may be used to control pH in the subsequent stages to improve pH control.

A temperature during the extraction stages of between about 20° C. and about 40° C. is preferred. When calcium oxide is used as the neutralizing agent, heating up to 40° C. during extraction helps to minimize emulsion formation.

A mixing time for each stage of about 3 minutes is preferred.

The extraction is conducted in counter-current stages, with fresh aqueous feed being introduced into a first vessel and cycled successively through each vessel to the last, while fresh extraction agent is introduced into the last vessel and cycled successively backwards through each vessel to the first, loaded extractant being withdrawn from the first vessel for stripping, and barren aqueous solution being withdrawn from the last vessel. The number of stages depends on the desired extraction percentage, and it has been found that up to 98.2 weight percent manganese can be extracted in three stages, with good rejection of magnesium, e.g., down to 1.3 weight percent extraction, and good rejection of calcium, chloride, potassium, and sodium, e.g., down to less than 0.5 weight percent extraction each.

Following the last extraction stage, the raffinate may be processed as desired for recovery of magnesium sulfate, if substantial quantities of magnesium are present therein. The raffinate may then be sent to provide makeup water to the organic regeneration step as hereinafter described.

The organics are scrubbed with water at a pH of less than about 1, preferably with an acid content of about 5 to about 50 g/l, at an organic to aqueous ratio of between about 1 to 1 and 4 to 1, and preferably about 3 to 1, using a mixing time of about 2 minutes, and at ambient temperature, heating up to about 40° C. when necessary to minimize emulsions. The flow rate through the scrub mixer can be somewhat faster than through the extractors. The scrub removes less than about 0.5 weight percent manganese, and minimal amounts of other impurities, although it may remove about 33 weight percent chloride ion. Scrub water may be recycled and re-used for scrubbing. Scrub aqueous may also be cycled back to the first extraction stage.

The scrubbed organic is then stripped, preferably with spent electrolyte from the electrowinning circuit. This spent electrolyte may contain up to about 150 grams per liter manganese, and preferably contains between about 25 and 50 grams per liter manganese. The spent electrolyte also typically contains between about 20 and 50 grams per liter sulfuric acid.

The strip solution is adjusted as necessary to a pH of less than about 1.0. The strip is conducted at ambient temperatures and at an organic to aqueous ratio of between about 0.5 and 2.5 to 1, and peferably about 2 to 1. Preferred mixing time is between about 1 and about 5 minutes, and preferably about 2 minutes.

The strip removes up to 99.2 weight percent of the manganese present in the organics.

The loaded strip is recycled to the electrowinning circuit, and the barren organics are sent to organic regeneration where they are contacted with an alkaline reagent such as a slurry of magnesium oxide or calcium oxide. Preferably the slurry is comprised of between about 150 and about 250 grams per liter and more preferably about 200 grams per liter magnesium oxide in recycled raffinate. If calcium oxide is used, the slurry preferably contains about 150 grams per liter calcium oxide.

The mixing time for organic regeneration is preferably between about 5 and 10 minutes, at ambient temperatures. When calcium oxide is used as the regeneration reagent, it is preferably also used in the final extractant stage for pH adjustment, and any calcium sulfate precipitated is removed by means of settlers. When magnesium oxide is used as the organic regeneration reagent, magnesium sulfate, which remains soluble, is carried off in the raffinate and recovered prior to recycle of the raffinate by means known to the art such as crystallization. The regenerated organics are cycled directly to the final extraction stage.

The foregoing process is also suitable for enhancing the concentration of zinc with respect to other impurities, including manganese, in zinc electrowinning circuits. Typical zinc electrowinning feed solutions may contain between about 100 and about 150 g/l zinc, and preferably about 120 g/l zinc, and may include manganese in concentrations of up to about 10 g/l. Fluorine may be present as an impurity in concentrations of up to about 20 ppm.

The preferred extractant is DEHPA, in a 50-50 mixture with a diluent such as Escaid 200. Zinc is also effectively extracted with extractants comprising down to about 30 percent DEHPA and about 70 percent diluent. The preferred organics to acqueous to ratio is between about 3 to 1 and about 4 to 1, and preferably about 3.5 to 1. Ambient temperature may be used. Preferably the mixers are heated to between about 30° C. and about 40° C. to break emulsions; and, when calcuim oxide is used for organic regeneration and pH control, heating to about 40° C. during the extraction and scrub stages is preferred.

The preferred pH for efficient zinc extraction is between about 2 and 2.5, and preferably about 2.3.

Zinc may be extracted in three stages up to 99.9 weight percent of the zinc originally present in the feed, with manganese rejected down to about 1.6 weight percent, magnesium down to less than 0.1 weight percent, calcium down to 0.1 weight percent, and fluoride down to about 27.5 weight percent, with complete rejection of chloride ion. The aqueous scrub removes less than 0.1 weight percent of the zinc present in the organics, but may remove up to 27.6 weight percent of the fluoride present. The strip solution preferably contains between about 30 and about 60 grams per liter zinc, and most preferably about 50 grams per liter zinc, and about 120 grams per liter sulfuric acid. Up to about 80 weight percent of the zinc originally present in the feed is recovered in the strip solution for recycle to the electrowinning circuit, while manganese is rejected down to about 1.6 weight percent originally present in the feed, magnesium down to less than 0.1 weight percent originally present in the feed, calcium down to about 0.1 weight percent originally present in the feed, while chloride is essentially eliminated. Fluoride is reduced down to about 5 weight percent originally present in the feed.

From the foregoing it can be seen that manganese and zinc can be effectively separated from a number of impurities, and the process can be used to increase the efficiency of manganese dioxide and zinc electrowinning circuits both by enhancing recovery of manganese or zinc metals and by reducing problems associated with typical impurities in the circuits.

EXAMPLES

Example 1

Organic Extraction Stages (Mn)

Aqueous solutions containing manganese and magnesium as set forth in Table 1 were contacted with an extractant composed of 80 percent Escaid 200 and 20 percent DEHPA by volume, conditioned with 150 grams per liter $H_2SO_4$, in a number of stages, reusing the organic, but supplying fresh aqueous solutions for each stage, at an organic to aqueous ratio of 3 to 1, a temperature of 20° C., a contact time of 5 minutes per stage and a pH as shown in Table 1. Results are set forth in Table 1.

TABLE 1

| | Stage No. | 1 | 2 | 3 | 4 | 5 |
|---|---|---|---|---|---|---|
| Test 1 | pH | 4.07 | 4.14 | 4.05 | 4.06 | 4.07 |
| Aqueous = | Organic | | | | | |
| 21.4 g/l Mn | MgO (g/l) | 7.3 | 1.0 | 0 | 0 | 0 |
| 2.61 g/l Mg | Mn (g/l) | 6.51 | 10.4 | 10.6 | 10.3 | 13.0 |
| | Aqueous | | | | | |
| | Mn (g/l) | 1.88 | 9.65 | 20.9 | 22.2 | 22.4 |
| Test 2 | pH | 4.3 | 4.2 | 4.4 | 4.5 | — |
| Aqueous = | Organic | | | | | |
| 53.2 g/l Mn | MgO (g/l) | 10.3 | 0 | 0 | 0 | — |
| 26.1 g/l Mg | Mn (g/l) | 13.9 | 16.9 | 19.9 | 20.6 | — |
| | Aqueous | | | | | |
| | Mn (g/l) | 11.5 | 44.3 | 45.5 | 50.0 | — |

Example 2

Aqueous Extraction Stages (Mn)

The aqueous solutions of Tests 1 and 2 of Example 1 were contacted with organic extractant with a composition as described in Example 1 in a number of stages, reusing the aqueous solutions, but supplying fresh extractant for each stage, under the conditions described in Example 1. Results are set forth in Table 2.

TABLE 2

| | Stage No. | 1 | 2 | 3 | 4 |
|---|---|---|---|---|---|
| Test 1 | pH | 4.07 | 4.10 | 4.04 | 4.10 |
| Aqueous = | Organic | | | | |
| 21.4 g/l Mn | MgO (g/l) | 7.3 | 7.0 | 7.3 | 7.3 |
| 2.61 g/l Mg | Mn (g/l) | 6.51 | 0.60 | 0.04 | 0.005 |
| | Aqueous | | | | |
| | Mn (g/l) | 1.88 | 0.103 | 0.006 | 0.002 |
| Test 2 | pH | 4.3 | 4.1 | 4.2 | 4.1 |
| Aqueous = | Organic | | | | |
| 53.2 g/l Mn | MgO (g/l) | 10.3 | 7.3 | 9.3 | 8.7 |
| 26.1 g/l Mg | Mn (g/l) | 13.9 | 3.3 | 0.5 | 0.02 |
| | Aqueous | | | | |
| | Mn (g/l) | 11.5 | 1.52 | 0.080 | 0.009 |

Example 3

Organic Extraction Stages (Zn)

An aqueous solution containing 127 grams per liter zinc, 3.07 grams per liter manganese, and 8.34 grams per liter magnesium was contacted with an extractant composed of 50 percent Escaid 200 by volume and 50 percent DEHPA conditioned with 150 grams per liter $H_2SO_4$ in four stages, reusing the organic, but supplying fresh aqueous solution for each stage, at an organic to aqueous ratio of 4 to 1 a pH of 2.1 to 2.2 maintained with 150 grams per liter MgO, at a temperature of 20° C. for a contact time of 5 minutes per stage. Results are set forth in Table 3.

TABLE 3

| Stage No. | 1 | 2 | 3 | 4 |
|---|---|---|---|---|
| Organic | | | | |
| MgO (g/l) | 9.4 | 21.1 | 11.8 | 0.1 |
| Zn (g/l) | 0.33 | 23.5 | 44.9 | 56.7 |
| Aqueous | | | | |
| Zn (g/l) | 0.085 | 1.41 | 41.5 | 80.0 |

Example 4

Aqueous Extraction Stages (Zn)

The aqueous solution of Example 3 was contacted with the organic extractant of Example 3 in two stages, reusing the aqueous solution, but supplying fresh extractant for each stage, under the conditions described in Example 3. Results are set forth in Table 4.

TABLE 4

| Stage No. | 1 | 2 |
|---|---|---|
| Organic | | |
| MgO (g/l) | 9.4 | 6.9 |
| Zn (g/l) | 0.33 | .01 |
| Aqueous | | |
| Zn (g/l) | 0.085 | 0.045 |

Example 5

Extraction and Strip Results

Aqueous solutions containing manganese in Tests 1–5 and zinc in Tests 6–8 as set forth in Table 5 were extracted with a DEHPA organic extractant of a composition set forth in Table 5 under the indicated conditions. The loaded organics were scrubbed with a water scrub at pH 4 prior to stripping. Results are set forth in Table 5 in terms of percent of feed components extracted. The pH adjustment reagent set forth in the table was added to the last extraction stage, and pH adjustment in earlier stages was accomplished with sodium hydroxide.

TABLE 5a

| | Aqueous Feed (g/l) | | | | | | | | Extractant | |
|---|---|---|---|---|---|---|---|---|---|---|
| Test No. | Zn | Mn | Mg | Ca | Cl | K | Na | F | DEHPA | Escaid 200 |
| 1 | — | 43.6 | 14.4 | .599 | .059 | .009 | .068 | — | 30% | 70% |
| 2 | — | 41.3 | 14.4 | .599 | .059 | .009 | .068 | — | 30% | 70% |
| 3 | — | 53.6 | 3.1 | .733 | .134 | .645 | .620 | — | 30% | 70% |
| 4 | — | 53.6 | 3.1 | .733 | .134 | .645 | .620 | — | 30% | 70% |
| 5 | — | 54.0 | 15.4 | .586 | .072 | .244 | — | — | 30% | 70% |
| 6 | 127 | 3.07 | 8.34 | .505 | 0.15 | — | — | .003 | 40% | 60% |
| 7 | 127 | 3.07 | 8.34 | .505 | 0.15 | — | — | .003 | 40% | 60% |
| 8 | 133 | 2.97 | 5.47 | .880 | .112 | — | — | <.001 | 30% | 70% |

TABLE 5b

| Test No. | Phase | O/A ratio | T (°C.) | No. of Stages | pH Control Reagent (g/l organic) | Strip (g/l) Zn | Mn | $H_2SO_4$ |
|---|---|---|---|---|---|---|---|---|
| 1 | Extraction | 3/1 | 30–40 | 3 | MgO-23.4 | — | 33 | 50 |
| | Strip | 2.4/1 | 20–25 | 2 | $H_2SO_4$-pH < 1 | | | |
| 2 | Extraction | 3.6/1 | 30–40 | 3 | MgO-9.3 | — | 33 | 50 |
| | Strip | 2.7/1 | 20–25 | 2 | $H_2SO_4$-pH < 1 | | | |
| 3 | Extraction | 3.3/1 | 30–40 | 3 | MgO-12.3 | — | 36 | 30 |
| | Strip | 2.6/1 | 20–25 | 2 | $H_2SO_4$-pH < 1 | | | |
| 4 | Extraction | 3/1 | 20 | 2 | MgO-13 | — | 36 | 30 |
| | Strip | 2.6/1 | 20 | 1 | $H_2SO_4$-pH < 1 | | | |
| 5 | Extraction | 3.2/1 | 35–40 | 2 | NaOH-pH 4* | — | 34.6 | 50 |
| | Strip | 6/1 | 35–40 | 1 | $H_2SO_4$-pH < 1 | | | |
| 6 | Extraction | 3.5/1 | 30–40 | 3 | MgO-20.7 | 50.5 | — | 120 |
| | Strip | 1.3/1 | 20 | 2 | $H_2SO_4$-pH < 1 | | | |
| 7 | Extraction | 3.6/1 | 30–40 | 3 | Ca(OH)2-12.6* | 50.5 | — | 120 |
| | Strip | 1.5/1 | 30–40 | 2 | $H_2SO_4$-pH < 1 | | | |
| 8 | Extraction | 4/1 | 35–40 | 3 | NaOH-pH 2* | 50.5 | — | 120 |

TABLE 5b-continued

| | | PARAMETERS | | | | | | |
|---|---|---|---|---|---|---|---|---|
| | | O/A | T | No. of | pH Control Reagent | Strip (g/l) | | |
| Test No. | Phase | ratio | (°C.) | Stages | (g/l organic) | Zn | Mn | $H_2SO_4$ |
| | Strip | 1.5/1 | 35–40 | 2 | $H_2SO_4$-pH < 1 | | | |

*Ca(OH)$_2$ used for organic regeneration

TABLE 5c

| | | RESULTS | | | | | | | |
|---|---|---|---|---|---|---|---|---|---|
| | | Extraction (% of Feed) | | | | | | | |
| Test No. | Product | Zn | Mn | Mg | Ca | Cl | K | Na | F |
| 1 | Loaded Organic | — | 93.9 | 2.9 | 100 | 12.3 | 0 | 14.0 | — |
| | Loaded Strip | — | 67.3 | 2.9 | 148 | 12.3 | 0 | 14.0 | — |
| 2 | Loaded Organic | — | 98.2 | 2.5 | 89.6 | 27.1 | 0 | 0.4 | — |
| | Loaded Strip | — | 64.4 | 7.0 | 50.7 | 27.1 | 0 | 0.4 | — |
| 3 | Loaded Organic | — | 99.7 | 1.8 | 49.3 | 0 | 0.7 | 0.4 | — |
| | Loaded Strip | — | 65.1 | 1.8 | 49.3 | 0 | 0.7 | 0.4 | — |
| 4 | Loaded Organic | — | 95.7 | 6.3 | 0.4 | 12.1 | 1.4 | 1.5 | — |
| | Loaded Strip | | 63.9 | 6.3 | 51.1 | 12.1 | 1.4 | 1.5 | — |
| 5 | Loaded Organic | — | 98.0 | 16.0 | — | 15.3 | 1.6 | — | — |
| | Loaded Strip | — | 60.7 | 16.0 | — | 15.3 | 1.6 | — | — |
| 6 | Loaded Organic | 99.4 | 3.4 | <0.1 | 0.9 | 1.8 | — | — | 39.8 |
| | Loaded Strip | 51.3 | 3.4 | <0.1 | 5.7 | 28.5 | — | — | — |
| 7 | Loaded Organic | 94.8 | 1.6 | 0.1 | 0.1 | 0 | — | — | 2.75 |
| | Loaded Strip | 49.0 | 1.6 | 0.1 | 0 | 0 | — | — | — |
| 8 | Loaded Organic | 99.9 | 7.3 | 0.6 | 0.8 | 10.7 | — | — | — |
| | Loaded Strip | 79.6 | 7.3 | 0.6 | 0.8 | 10.7 | — | — | — |

What is claimed:

1. In a process for recovering a desired component selected from the group consisting of manganese and zinc by electrowinning the desired component from an aqueous solution containing impurities selected from the group consisting of magnesium when said desired component is zinc and potassium, when said desired component is manganese, the improvement comprising substantially reducing the amount of at least one of the aforesaid impurities in the electrowinning feed solution and substantially increasing the amount of metal ions of the desired component therein by:
   a. mixing an aqueous bleed stream from said electrowinning feed solution with a solvent extraction agent comprising diethylhexylphosporic acid as an organic extraction agent and an organic solvent therefore to form mixture having a pH of from about 1 to about 5 and an organic to aqueous ratio of from about 0.5 to about 4 to selectively extract desired metal ions;
   b. separating the aqueous and organic portions of the mixture of step (a);
   c. stripping the loaded organic extractant of step (b) with a dilute acidic solution;
   d. recycling the loaded strip solution of step (c) to said electrowinning process.

2. The process of claim 1 in which the strip solution of step (c) is spent electrowinning solution from the process.

3. The process of claim 1 in which the pH of the mixture of step (a) is adjusted with a pH-adjusting reagent to between about 1 and about 5.

4. The process of claim 3 in which the pH adjusting reagent is at least one reagent selected from the group consisting of calcium oxide, magnesium oxide, sodium hydroxide, and ammonia.

5. The process of claim 1 or claim 3 in which the stripped organic extractant is regenerated with a reagent selected from the group consisting of calcium oxide and magnesium oxide.

6. The process of claim 5 in which the selected regeneration reagent is also used as the pH-adjusting reagent in step (a).

7. The process of claim 6 in which magnesium oxide is the pH-adjusting reagent, and a magnesium salt is recovered from the aqueous raffinate of step (b).

8. The process of claim 1 or claim 2 in which the desired metal ions are manganese ions, and the impurities to be reduced also include potassium and sodium ions.

9. The process of claim 4 in which the pH is maintained between about 2.5 and about 4.3.

10. The process of claim 1 or claim 2 in which the desired metal ions are zinc ions, and the impurities also to be reduced include manganese, calcium, and fluoride ions.

11. The process of claim 5 in which the pH is maintained at less than about 2.5.

12. The process of claim 1 or claim 2 in which the organic to aqueous ratio of the mixture of step (a) is between about 3.0 and about 4.0.

13. The process of claim 1 in which the pH of the strip solution of step (c) is maintained at less than about 1.

14. The process of claim 1 in which the extraction is carried out continuously in more than one extraction vessel, with a counter-current flow of aqueous and organic phases, fresh aqueous feed being introduced to the first vessel and cycled successively through each vessel to the last vessel, while fresh extraction agent is introduced into the last vessel and cycled successively backward through each vessel to the first vessel, loaded extractant being withdrawn from the first vessel for stripping, and barren aqueous solution being withdrawn from the last vessel.

15. The process of claim 14 in which the number of extraction stages is 3.

16. A process for substantially separating manganese ions from potassium and, if present other impurities selected from the group consisting of magnesium, chloride and sodium ions, in an aqueous manganese solution containing such impurities, which comprises:

a. mixing the solution with a solvent extraction agent comprising diethylhexylphophoric acid as an organic extraction agent and an organic solvent therefor to form a mixture having a pH from about 1 to about 5 and an organic to aqueous ratio of from about 0.5 to about 4 to selectively extract manganese ions;

b. adjusting the pH of the mixture of step (a) with a pH-adjusting reagent so as to maintain the pH of the mixture between about 2.5 and about 4.3;

c. separating the aqueous and organic portions of the mixture of step (b);

d. stripping the loaded organic extractant of step (c) with an aqueous acidic solution to remove managanese therefrom.

17. The process of claim 16 in which the aqueous manganese solution is a bleed from an electrowinning circuit for manganese dioxide, and the strip solution of step (d) is spent electrowinning solution; and the loaded strip solution resulting from step (d) is recycled to the electrowinning process.

18. The process of claim 16 or claim 17 in which the solvent extraction agent comprises a mixture of DEHPA and an organic diluent therefor, and the organic to aqueous ratio of the mixture of step (a) is between about 3.0 and 4.0.

19. The process of claim 16 or claim 17 in which the stripped organic extractant is regenerated with a reagent selected from the group consisting of calcium oxide and magnesium oxide.

20. The process of claim 16 or claim 17 in which the pH of the strip solution of step (d) is maintained at less than about 1.

21. The process of claim 16 or claim 17 in which the extraction is carried out in three counter-current stages.

22. A process for substantially separating zinc ions from magnesium and, if present, other impurities selected from the group consisting of manganese, calcium, chloride, and fluoride ions in an aqueous zinc solution containing such impurities; which comprises:

a. mixing the solution with a solvent extraction agent comprising diethylhexylphosphoric acid as an organic extraction agent and an organic solvent therefor to form a mixture having a pH of about 1 to about 5 and an organic to aqueous ratio of from about 0.5 to about 4 to selectively extract zinc ions;

b. adjusting the pH of the mixture of step (a) with a pH-adjusting reagent so as to maintain the pH of the mixture below about 2.5;

c. separating the aqueous and organic portions of the mixture of step (b);

d. stripping the loaded organic extractant of step (c) with an aqueous acidic solution to remove zinc therefrom.

23. The process of claim 22 in which the aqueous zinc solution is a bleed from a zinc electrowinning circuit, and the strip solution of step (d) is spent electrowinning solution; and the loaded strip solution resulting from step (d) is recycled to the electrowinning process.

24. The process of claim 21 or claim 22 in which the solvent extraction agent comprises a mixture of DEHPA and an organic diluent therefor, and the organic to aqueous ratio of the mixture is between about 3.0 and 4.0.

25. The process of claim 22 or claim 23 in which the stripped organic extractant is regenerated with a reagent selected from the group consisting of calcium oxide and magnesium oxide.

26. The process of claim 22 or claim 23 in which the pH of the strip solution of step (d) is maintained at less than about 1.

27. The process of claim 22 or claim 23 in which the extraction is carried out in three counter-current stages.

* * * * *